(12) United States Patent
Yoo et al.

(10) Patent No.: US 12,574,525 B2
(45) Date of Patent: Mar. 10, 2026

(54) STORAGE DEVICE, HOST SYSTEM HAVING THE SAME AND OPERATING METHOD THEREOF

(71) Applicant: Samsung Electronics Co., Ltd., Suwon-si (KR)

(72) Inventors: Hyunjoon Yoo, Suwon-si (KR); Minho Kim, Suwon-si (KR); Dongouk Moon, Suwon-si (KR); Sooyoung Ji, Suwon-si (KR); Sanghwa Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 18/199,173

(22) Filed: May 18, 2023

(65) Prior Publication Data

US 2024/0089462 A1     Mar. 14, 2024

(30) Foreign Application Priority Data

Sep. 13, 2022    (KR) ........................ 10-2022-0114920

(51) Int. Cl.
| | |
|---|---|
| *H04N 19/159* | (2014.01) |
| *G06V 10/25* | (2022.01) |
| *G06V 10/74* | (2022.01) |
| *G06V 40/16* | (2022.01) |
| *H04N 19/46* | (2014.01) |

(52) U.S. Cl.
CPC .......... *H04N 19/159* (2014.11); *G06V 10/25* (2022.01); *G06V 10/761* (2022.01); *G06V 40/161* (2022.01); *H04N 19/46* (2014.11)

(58) Field of Classification Search
CPC .... G06V 10/25; G06V 10/761; G06V 40/161; G06V 20/40; G06V 20/95; G06V 40/172; H04N 19/159; H04N 19/46; H04N 19/167
USPC ......................................................... 375/240
See application file for complete search history.

(56) References Cited

U.S. PATENT DOCUMENTS

| | | | |
|---|---|---|---|
| 9,984,256 | B2 | 5/2018 | Liu et al. |
| 10,529,378 | B2 | 1/2020 | Miura et al. |
| 11,039,205 | B2 | 6/2021 | Ye et al. |
| 11,310,048 | B2 | 4/2022 | Brown et al. |
| 11,317,128 | B1 | 4/2022 | Perkalsky et al. |
| 2019/0208076 | A1* | 7/2019 | Berman ............... H04L 9/3231 |
| 2020/0042695 | A1 | 2/2020 | Kanei et al. |

(Continued)

FOREIGN PATENT DOCUMENTS

| | | |
|---|---|---|
| CN | 108921017 A | 11/2018 |
| CN | 109886083 A | 6/2019 |

*Primary Examiner* — Masum Billah
(74) *Attorney, Agent, or Firm* — Sughrue Mion, PLLC

(57) ABSTRACT

An operating method of a storage device, includes: receiving decoded data from a codec; determining whether the decoded data includes a region of interest (ROI); based on determining the ROI is included in the decoded data, determining whether the decoded data includes a first background region, other than the ROI, identical to a second background region of an adjacent frame; based on determining the first background region is identical to the second background region, determining a similarity for the ROI between the decoded data and the adjacent frame; determining whether the similarity is lower than a reference value; and based on determining the similarity is lower than the reference value, generating detection information indicating that the decoded data is faked.

18 Claims, 16 Drawing Sheets

(56) References Cited

U.S. PATENT DOCUMENTS

| | | | |
|---|---|---|---|
| 2020/0267404 A1 | 8/2020 | Levy et al. | |
| 2020/0286112 A1* | 9/2020 | Zhou | G06N 3/045 |
| 2021/0112306 A1* | 4/2021 | Ye | H04N 21/4542 |
| 2022/0058375 A1 | 2/2022 | Kwon et al. | |
| 2022/0108041 A1 | 4/2022 | Semeikin | |

* cited by examiner

| Frame | LBA |
|---|---|
| 1 | 1 ~ 2 |
| 2 | 3 ~ 5 |
| 3 | 6 |
| 4 | 7 ~ 13 |
| 5 | 14 ~ 16 |
| 6 | 17 ~ 20 |
| n | . . . |

GoP

1

STORAGE DEVICE, HOST SYSTEM HAVING THE SAME AND OPERATING METHOD THEREOF

CROSS-REFERENCE TO RELATED APPLICATION(S)

This application claims priority to Korean Patent Application No. 10-2022-0114920 filed on Sep. 13, 2022 in the Korean Intellectual Property Office, the disclosure of which is incorporated by reference herein in its entirety.

BACKGROUND

The present disclosure relates to a storage device, a host system having the same, and a method of operating the same.

In general, a storage device based on a flash memory may be used as a mass storage medium of a computing system. A general storage device may have a function of storing data under control of a host device. Recently, in order to reduce a calculation burden on a host device, storage devices supporting various calculation operations or various applications therein are being developed.

A problem exists when data which is a counterfeit or not genuine is stored on a storage device. Such data may be referred to as fake data. A host data may not recognize data obtained from the storage device as fake data.

SUMMARY

Example embodiments provide a storage device detecting fake images of fake video data, a host system having the same, and a method of operating the same.

According to an aspect of an example embodiment, an operating method of a storage device, includes: receiving decoded data from a codec; determining whether the decoded data includes a region of interest (ROI); based on determining the ROI is included in the decoded data, determining whether the decoded data includes a first background region, other than the ROI, identical to a second background region of an adjacent frame; based on determining the first background region is identical to the second background region, determining a similarity for the ROI between the decoded data and the adjacent frame; determining whether the similarity is lower than a reference value; and based on determining the similarity is lower than the reference value, generating detection information indicating that the decoded data is faked.

According to an aspect of an example embodiment, a storage device includes: at least one non-volatile memory device; a controller connected to a first channel and configured to control the at least one non-volatile memory device; a scaler configured to encode video data using a codec or to decode encoded video data using the codec; and a micro-controller unit (MCU) configured to: perform a detection operation for detecting images which have been altered of the decoded video data from the scaler, generate detection information according to the detection operation, and output the detection information to an external device through a second channel.

According to an aspect of an example embodiment, a host system includes: a storage device configured to perform a detection operation with respect to video data; and a host device configured to: transmit the video data to the storage device through a first channel, and receive detection information of the video data from the storage device through a second channel, wherein the video data includes a plurality of contiguous frames, wherein the plurality of contiguous frames include an intra-frame, a predicted frame, or a bidirectional predicted frame, and wherein the detection operation compares the intra-frame and the predicted frame or compare the intra-frame and the bidirectional predicted frame.

BRIEF DESCRIPTION OF DRAWINGS

The above and other aspects, features, and advantages of the present disclosure will be more clearly understood from the following detailed description of example embodiments, taken in conjunction with the accompanying drawings, in which.

DETAILED DESCRIPTION

Hereinafter, example embodiments will be described with reference to the accompanying drawings.

A storage device, a host system having the same, and a method of operating the same, according to an embodiment, may compare a previous frame and a subsequent frame of an intra-frame in the storage device equipped with a codec, to detect fake video data.

Figure 1:
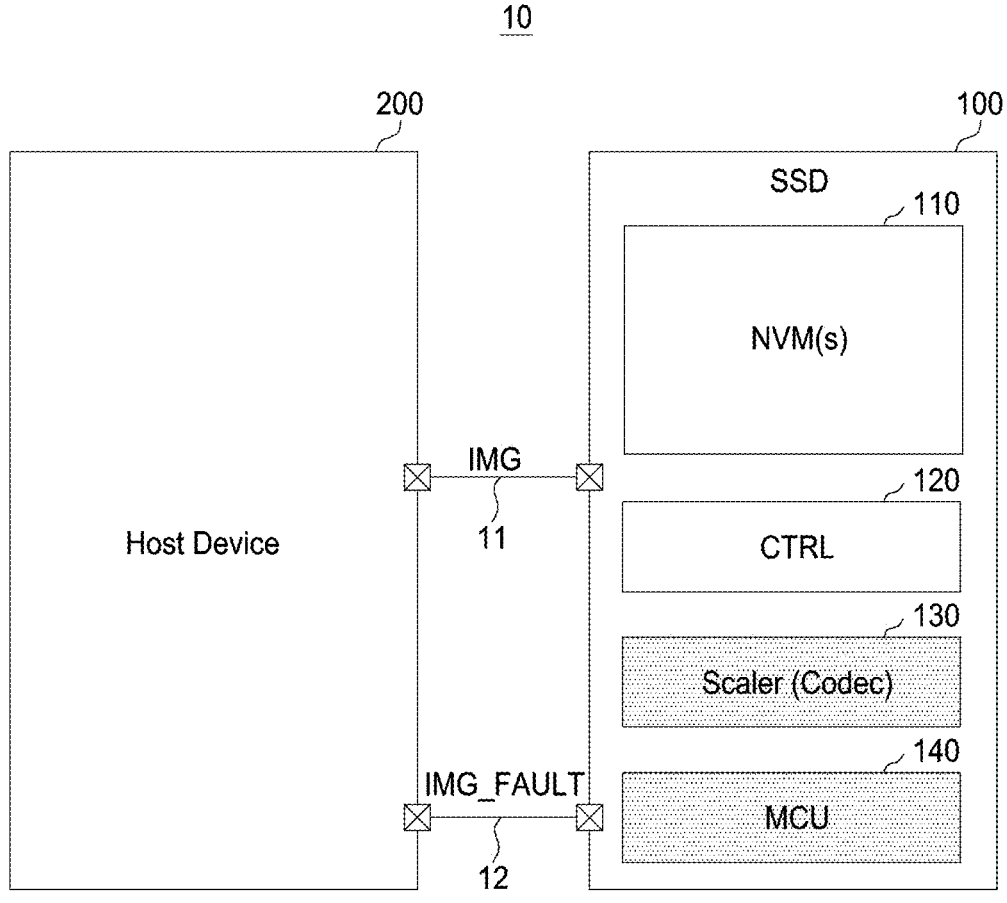
FIG. 1 is a view illustrating a host system 10 according to an embodiment.

FIG. 1 is a view illustrating a host system 10 according to an embodiment. Referring to FIG. 1, a host system 10 may include a storage device SSD 100 and a host device 200.

The host system 10 may be implemented as a server computer, a personal computer (PC), a desktop computer, a lap-top computer, a workstation computer, a network-attached storage (NAS), a data center, an internet data center (IDC), a CCTV system, or a mobile computing device. For example, the mobile computing device may be implemented as a smartphone, a tablet PC, or a mobile internet device (MID).

The storage device 100 may include at least one non-volatile memory device NVM 110, a controller CTRL 120, a scaler 130, and a microcontroller unit MCU 140.

The at least one non-volatile memory device NVM 110 may be implemented to store data. The non-volatile memory device 110 may be implemented as a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. Also, the non-volatile memory device 110 may be implemented to have a three-dimensional array structure.

The controller CTRL 120 may be implemented to control an overall operation of the storage device 100. The controller 120 may perform various management operations, such as cache/buffer management, firmware management, garbage collection management, wear leveling management, data deduplication management, read refresh/reclaim management, bad block management, multi-stream management, mapping management of host data and non-volatile memory, quality of service (QoS) management, system resource allocation management, non-volatile memory queue management, read level management, erase/program management, hot/cold data management, power loss protection management, dynamic thermal management, initialization management, redundant array of inexpensive disk (RAID) management, or the like.

The scaler 130 may be implemented to compress video data IMG. In an embodiment, the scaler 130 may include a codec. In this case, the codec may encode or decode video data, e.g., a frame. In an embodiment, the codec may include MPEG-2, MPEG-4, ITU-T H.263, ITU-T H.264/MPEG-4, Part 10, advanced video coding (AVC), or high efficiency video coding (HEVC). In an embodiment, the scaler 130 may be implemented in hardware, software, or firmware. For example, the scaler 130 may be implemented as a field programmable gate array (FPGA), an application specific integrated circuit (ASIC), a microprocessor, a microcontroller, or a digital signal processor.

The MCU 140 may be implemented to compare adjacent frames of the intra-frame in series, to determine whether the video data IMG is faked. Video data is faked if the video data has been altered to include counterfeit information so that the video data includes alterations which are not genuine. For example, face in the genuine video may be altered to look like someone else's face in the faked video data (see FIG. 6).

The MCU 140 may measure similarity with a previous frame in a region of interest (ROI) and a general region. The MCU 140 may generate detection information IMG_FAULT (also referred to as fake detection information herein) corresponding to a detection result (also referred to as a fake detection result herein), and may output the detection information IMG_FAULT to the host device 200. In this case, the similarity may be calculated based on various similarity algorithms such as distance-based similarity (e.g. Euclidean distance, Manhattan distance, Minkowski distance, or the like), angle-based similarity (e.g. cosine similarity), correlation-based similarity (e.g. Mahalanobis distance, Pearson correlation coefficient, or the like), frequency-based similarity (e.g., Jacquard similarity, simple matching coefficient, or the like), or the like. In an embodiment, the MCU 140 may measure similarity using a locality sensitive hashing (LSH) algorithm that indicates similarity between character strings.

The host device 200 may be implemented to control a data processing operation (e.g., a write operation or a read operation) of the storage device 100. The host device 200 may include at least one central processing unit (CPU), a buffer memory, a memory device, a memory controller, an interface circuit, or the like. The host device 200 may be implemented as an integrated circuit (IC), a motherboard, or a system on chip (SoC). According to an embodiment, the host device 200 may be implemented as an application processor or a mobile application processor.

Also, as illustrated in FIG. 1, the host device 200 may transmit video data IMG to the storage device 100 through a first channel 11. In this case, the first channel 11 may transmit data according to a first interface method. For example, the first interface method may include at least one of a non-volatile memory express (NVMe), a peripheral component interconnect express (PCIe), a serial at attachment (SATA), a small computer system interface (SCSI), a serial attached SCSI (SAS), a USB (universal storage bus) attached SCSI (UAS), an internet small computer system interface (iSCSI), a fiber channel, a fiber channel over ethernet (FCoE), a mobile industry processor interface (MIPI), an MIPI automotive SERDES solution (MASS), or a display port.

Also, as illustrated in FIG. 1, the host device 200 may receive detection information IMG_FAULT from the storage device 100 through a second channel 12. In this case, the second channel 12 may transmit data according to a second interface method. For example, the second interface method may include at least one of an inter integrated circuit (I2C), a serial peripheral interface (SPI), a universal asynchronous receiver/transmitter (UART), or a system management bus (SMBus).

When a general storage device generates video data for each resolution and for each size, it may be difficult to detect faked data. A storage device 100 according to an embodiment may compare adjacent frames of an intra-frame generated by a scaler 130, in series, to detect fake video data, and output detection information IMG_FAULT according to the detection result to an external device.

A host system 10 according to an embodiment may process video data in the storage device 100 without help of the host device 200, and simultaneously detect faked data, to improve overall system performance. Thus embodiments, for example, including an SSD with codec and similarity measurement, improve computing performance.

Figure 2:
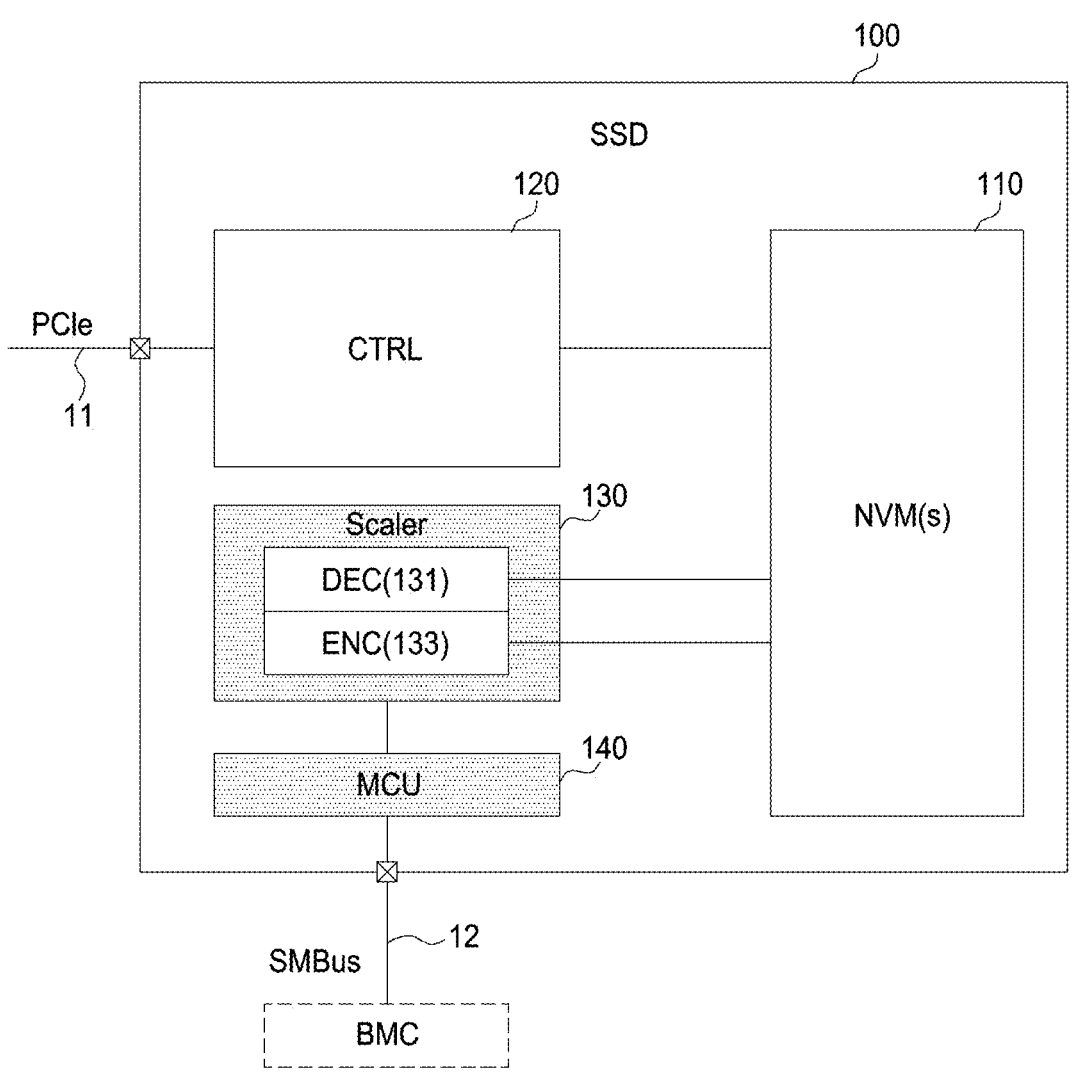
FIG. 2 is a view illustrating a storage device 100 according to an embodiment.

FIG. 2 is a view illustrating a storage device 100 according to an embodiment. Referring to FIG. 2, a controller 120 of a storage device 100 may be connected to a host device 200 through a first channel 11. In this case, the first channel 11 may transmit data according to a PCIe interface method.

A scaler 130 may include a decoder DEC 131 and an encoder ENC 133. The decoder 131 may read compressed video data from a non-volatile memory device 110, and may decode the compressed video data using a codec. The encoder 133 may compress video data using the codec, and may output the compressed video data to the non-volatile memory device 110.

An MCU 140 may compare adjacent frames of an intra-frame, in series, in a video data compression operation or a restoration operation, may measure similarity according to a comparison result thereof, and may determine alternation (faking) of the video data according to the measured similarity. As illustrated in FIG. 2, the MCU 140 may output detection information IMG_FAULT to an external device (e.g., a baseband management controller BMC) through a second channel 12 (or a sideband channel). In this case, the second channel may transmit data according to an SMBus method.

Figure 3A:
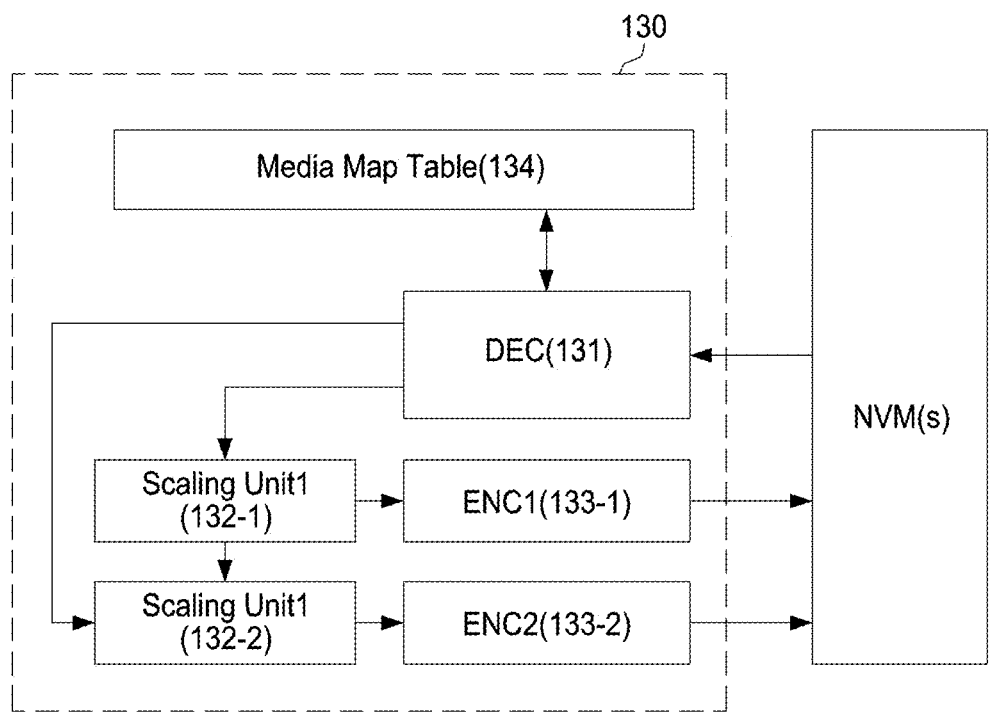
FIGS. 3A, 3B, and 3C are views illustrating a scaler 130 and an operation thereof according to an embodiment.
Figure 3B:
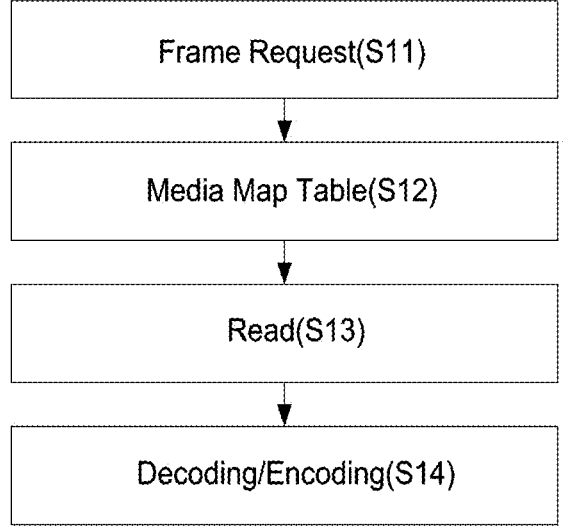
Figures 3C, 4:
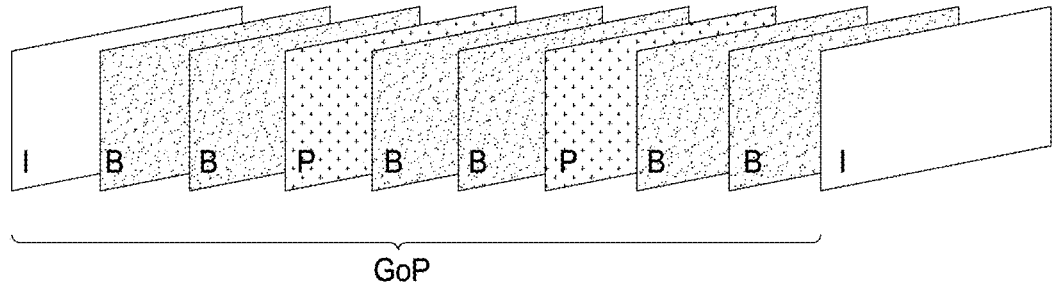
FIG. 4 is a view illustrating a general group of pictures (GoP)

FIGS. 3A, 3B, and 3C are views illustrating a scaler 130 and an operation thereof according to an embodiment.

Referring to FIG. 3A, a scaler 130 may include a decoder 131, a first scaling unit 132-1, a second scaling unit 132-2, a first encoder 133-1, a second encoder 133-2, and a media map table 134. The scaler 130 may transmit a sequential read request for data to a controller 120. The controller 120 may acquire data from a non-volatile memory device 110. The controller 120 that acquires the data from the non-volatile memory device 110 may transmit the acquired data to the scaler 130. In an embodiment, data may be a data stream having a plurality of frames. In another embodiment, data may be a data stream including a plurality of frame groups having at least one frame. For example, the data stream may be a media stream such as a video stream, an audio stream, or the like. In an embodiment, a data stream may be managed in an object unit.

The scaler 130 may generate the media map table 134 based on data received from the controller 120. The media map table 134 may map at least one logical address and an identifier, allocated to data received from the controller 120. In this case, the identifier allocated to the data may be an arbitrary value allocated by the scaler 130 to distinguish the same from other data. For example, when the data is a data stream having a plurality of frames, each of the plurality of frames may be sequentially allocated a positive integer value from 1.

Also, the scaler 130 may perform encoding based on the media map table 134. The scaler 130 may check at least one logical address allocated to data to be encoded based on the media map table 134. The scaler 130 may transmit a sequential read request for at least one logical address to the controller 120. In this case, the sequential read request may refer to a read request for at least one consecutive logical address. In particular, when receiving a sequential read request for a plurality of logical addresses from the scaler 130, the controller 120 may convert the plurality of logical addresses into physical addresses, may schedule read commands for the physical addresses, and the scheduled read commands may be provided to the non-volatile memory device 110. The controller 120 may schedule read commands for a plurality of physical addresses to quickly obtain data from the non-volatile memory device 110.

Also, the controller 120 may read data stored in the non-volatile memory device 110 in response to the sequential read request of the scaler 130. A codec included in the scaler 130 may decode, resize, and encode data obtained from the non-volatile memory device 110.

The decoder 131 may decode data acquired from the non-volatile memory device 110, and may transmit the decoded data to a buffer (not illustrated). In this case, the buffer may buffer the decoded data received from the decoder 131, and may transmit the same to the scaling units 132-1 and 132-2 corresponding thereto.

Each of the scaling units 132-1 and 132-2 may resize decoded data received from the buffer, and may generate resized data. Each of the scaling units 132-1 and 132-2 may change resolution of data to resize the data. Also, each of the scaling units 132-1 and 132-2 may change a frame rate of data to resize the data. For example, in resizing decoded frame, each of the scaling units 132-1 and 132-2 may reduce at least one of resolution or a frame rate of the decoded frame. Each of the scaling units 132-1 and 132-2 may transmit resized data to the encoders 133-1 and 133-2 corresponding thereto.

Each of the encoders 133-1 and 133-2 may encode the resized data to generate encoded data. A host device 200 (see FIG. 1) may make a read request for data having a different resolution, frame rate, or the like from original data initially stored in the non-volatile memory device 110. To quickly provide data having a different resolution and frame rate from the original data, in response to the read request of the host device 200, the scaler 130 may perform decoding, resizing, and encoding operations on the original data, and may transmit a write request for the encoded data to the controller 120. For example, when the storage device 100 receives a write request for original data from the host device 200, the storage device 100 may not only store the original data in the non-volatile memory device 110, but also generate various data having resolutions or frame rates, different from the original data, using the scaler 130, and store the same in the non-volatile memory device 110.

In an embodiment, a set of the first scaling unit 132-1 and the first encoder 133-1 and a set of the second scaling unit 132-2 and the second encoder 133-2 may be implemented to use different codecs or different rates.

In a storage device 100, for example, the scaler 130 may obtain a data stream stored in the non-volatile memory device 110 based on the media map table 134. A scaler 130 may obtain a data stream stored in the non-volatile memory device 110 without referring to the media map table. For example, when the scaler 130 first encodes a data stream stored in the non-volatile memory device 110, the scaler 130 may load the data stream into a buffer without the media map table 134 and may use the loaded data stream to generate the media map table 134.

Referring to FIG. 3B, a video data processing operation of the storage device 100 may proceed as follows. The scaler 130 may make a sequential read request for video data from the controller 120. For example, the scaler 130 may make a sequential read request for one frame among a plurality of frames included in a data stream (S11). At least one logical address may be allocated to the plurality of frames included in the data stream, respectively. The scaler 130 may check the media map table 134 to see if a logical address corresponding to a frame request exists (S12).

First of all, when the media map table 134 is not generated in the scaler 130, the scaler 130 may not know respective logical addresses allocated to respective frames in the data stream. Therefore, the sequential read request may be transmitted to the controller 120 for each logical address to encode the frame. The controller 120 may read data from the non-volatile memory device 110 in response to the received sequential read request for one logical address (S13). The controller 120 may transmit data read from the non-volatile memory device 110 to the scaler 130. Based on the data received from the controller 120, the scaler 130 may check whether all data for encoding one frame exists. When it is determined that all data for encoding one frame exists, the scaler 130 may perform decoding and encoding of the frame (S14). When it is determined that all data for encoding one frame does not exist, the scaler 130 may transmit a read request to the controller 120 for the next logical address of the logical address immediately before the read request to encode the one frame. When one logical address is allocated to one frame, the scaler 130 may not transmit a read request for the next logical address to the controller 120. When two or more logical addresses are allocated to one frame, the scaler 130 may transmit a read request for the next logical address to the controller 120 at least once to encode the frame.

Referring to FIG. 3C, the scaler 130 may generate the media map table 134. The media map table 134 may include at least one logical address allocated to each of a plurality of frames included in the data stream, and an identifier of each of the plurality of frames. For example, the at least one logical address allocated to each of a plurality of frames may be at least one logical block address (LBA). A frame number as the identifier may be sequentially allocated to each of the plurality of frames.

In another embodiment, the media map table 134 may be the same as the existing mapping table of the storage device, but may change the frame in a manner as a filename, a media number, or the like, and may also save a logical block address (LBA) for each file or video.

When the media map table 134 is generated, the scaler 130 will then know a logical address to which a read request is to be made in order to encode each of the frames included in the data stream based on the media map table 134. The scaler 134 may make a sequential read request for at least one logical address allocated to each of a plurality of frames in frame units. According to the sequential read request, the controller 120 may read data from the non-volatile memory device 110 (S13). Afterwards, the scaler 130 may decode or encode data received from the controller 120 (S14). Scaler 130 may quickly obtain a frame for encoding. When the sequential read request received by the controller 120 includes a plurality of contiguous logical addresses, the controller 120 may prefetch a memory region corresponding to a logical address next to the logical address corresponding to a memory region of the non-volatile memory device 110 currently being accessed, to quickly read the data. When at least one logical address included in a sequential read command received from the scaler 130 is a plurality of logical addresses, the controller 120 may read data of the currently accessed memory region, and may perform a previous operation to read data of a memory region corresponding to the next logical address. The controller 120 that has read data corresponding to at least one logical address may transmit the data to the scaler 130.

FIG. 4 is a view illustrating a general group of pictures (GoP). An intra-frame (I) may be the same frame, or a frame encoded using spatial prediction of a neighboring block in slice. The intra-frame (I) may be a reference frame for motion estimation. The intra-frame (I) may be independently decoded without other image references. A predicted frame (P) may be a frame in which a changed portion is encoded by referring to a previous frame. A bidirectional predicted frame (B) may be a frame in which a changed portion is encoded by referring to a previous frame and a subsequent frame.

Figure 5:
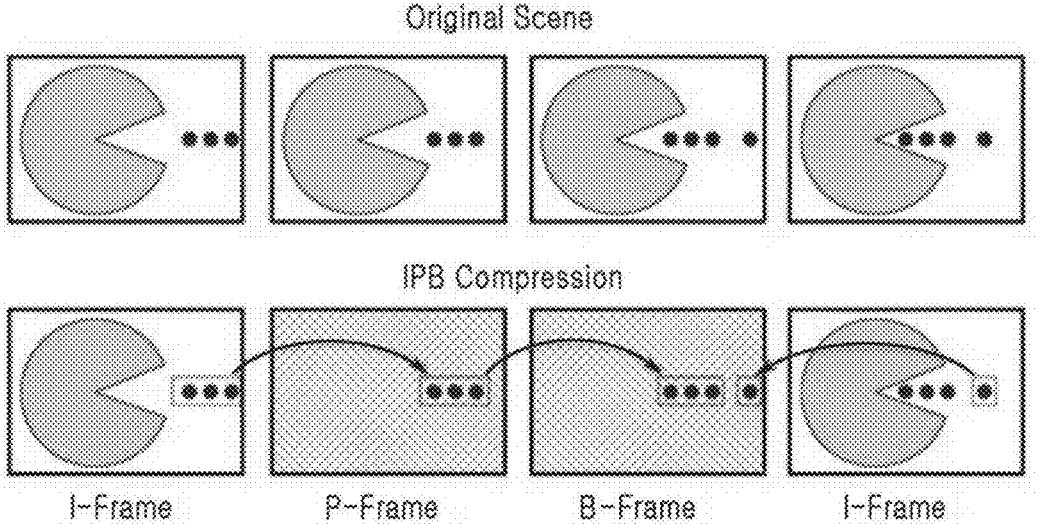
FIG. 5 is a view illustrating a process of detecting a region of interest (ROI) using a GoP.

FIG. 5 is a view illustrating a process of detecting a region of interest (ROI) using GoP. Typically, an ROI may be a region of interest (e.g., a face or the like) when encoding. In an embodiment, the ROI may be separately designated and managed (a bit rate setting, etc.). In general, face detection is possible through an algorithm such as discrete cosine transform (DCT), a motion vector, PCA/ICA/K-L or the like. A DCT coefficient represents pixel information in a screen in a frequency domain. In general, an intra-frame may be obtained from the DCT coefficients. In this case, the motion vector may include a predicted frame (P) and a bidirectional predicted frame (B).

Figure 6:
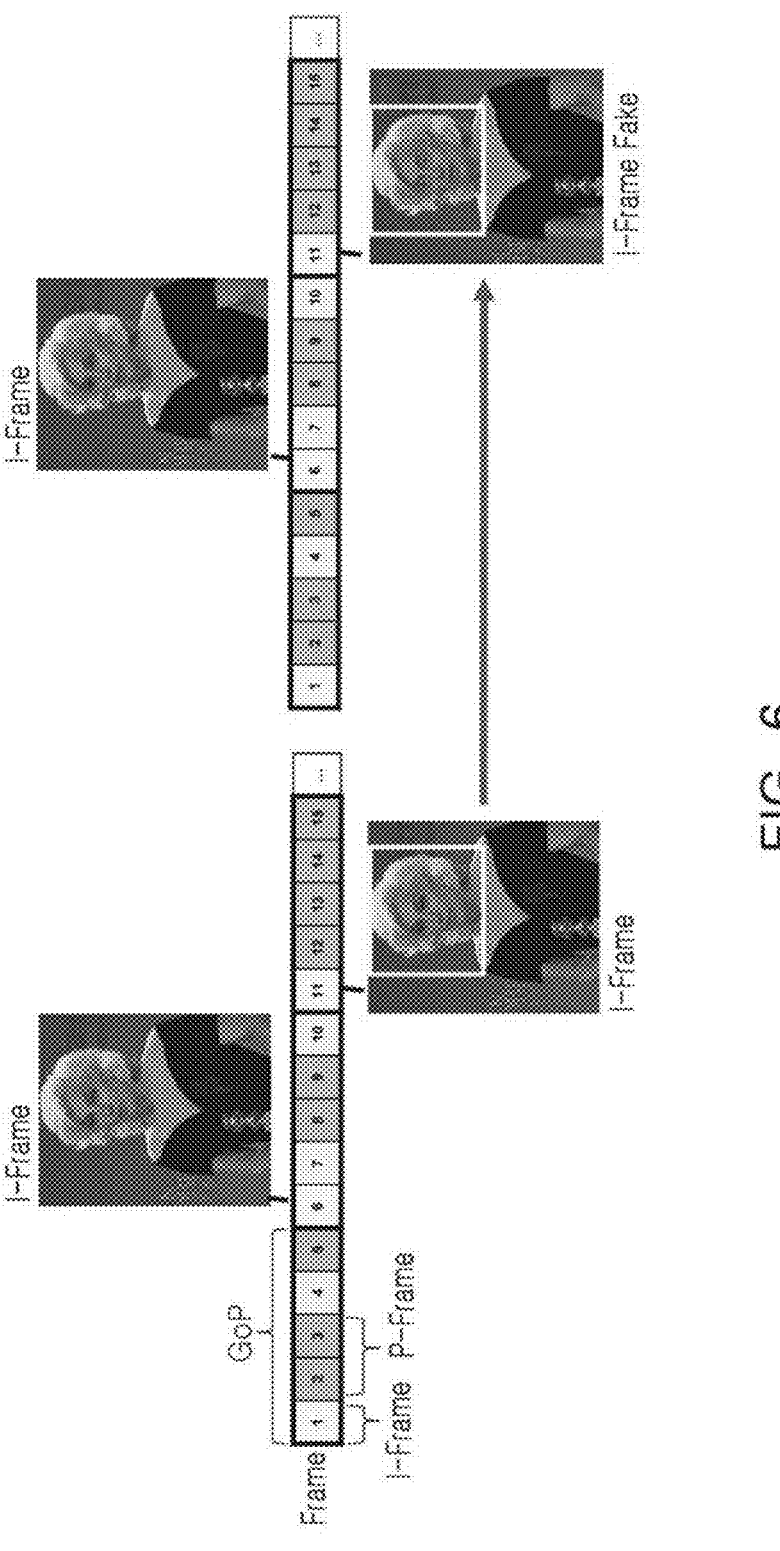
FIG. 6 is a view illustrating that some video data stored in a storage device is faked by hacking.

FIG. 6 is a view illustrating that some video data stored in a storage device has been altered by hacking (faked). As illustrated in FIG. 6, a hacker (bad actor) may modulate and insert only a portion of video data. For example, only a face area of an infra frame may be modulated as a different image.

Figure 7:
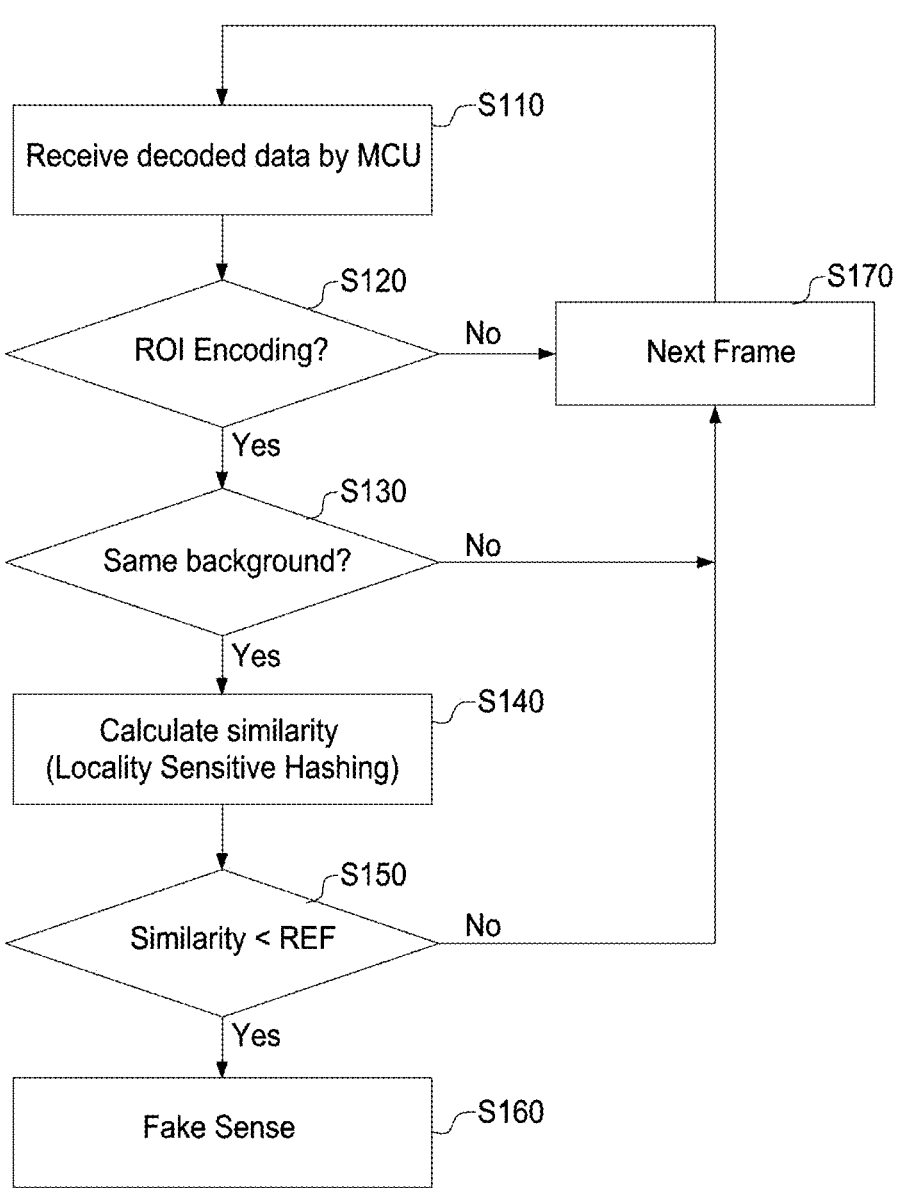
FIG. 7 is a flowchart illustrating a method of operating a storage device according to an embodiment.

FIG. 7 is a flowchart illustrating a method of operating a storage device according to an embodiment. Referring to FIGS. 1 to 7, a detection operation of a storage device 100 to identify altered data (counterfeit, that is, fake data) may proceed as follows. The detection operation may also be referred to herein as a fake detection operation.

The MCU 140 may receive data decoded by the scaler 130 (S110). In an embodiment, decoded data may include an intra-frame. In an embodiment, an adjacent frame may include a previous frame or a subsequent frame of the intra-frame. In an embodiment, the adjacent frame may include a predicted frame or a bidirectional predicted frame. The MCU 140 may determine whether the decoded data includes ROI-encoded data (S120). When the ROI-encoded data exists, the MCU 140 may determine whether background regions are identical (S130). In this case, the background regions may be a region other than a region of interest (ROI), respectively. For example, the background around a person's face (ROI), not including the person's face. When the background regions are identical, the MCU 140 may calculate similarity for the ROI (S140). For example, the MCU 140 may calculate the similarity for the ROI using a locality sensitive hashing (LSH) technique. It should be understood that the similarity calculation is not limited to the LSH technique. Various techniques such as a Jaccard similarity technique, an MIN-Hash technique, or the like may be applied to the similarity calculation.

The MCU 140 may determine whether the calculated similarity is lower than a reference value REF (S150). When the similarity I lower than the reference value REF, the MCU 140 may determine that a frame corresponding to the ROI is faked (S160). In an example, the representation of the genuine face has been altered to be a counterfeit face. See FIGS. 6 and 8. For example, when the LSH technique is applied, if the hash value is less than the reference value REF, the MCU 140 may determine that a frame corresponding to the ROI is faked. In the LSH technique, the hash value may be similar as data may be the same. When altered data (a fake) is detected, the MCU 140 may add a fake suspicion flag to metadata of the frame corresponding thereto. The fake suspicion flag may include the detection information IMG_FAULT illustrated in FIG. 1. In an embodiment, the fake suspicion flag may be transmitted to a BMC or an external device through the second channel.

The MCU 140 may perform a detection operation for the next frame, when there is no ROI region in S120, when background regions are not identical in S130, or when similarity is greater than or equal to the reference value REF in S150 (S170).

Figure 8:
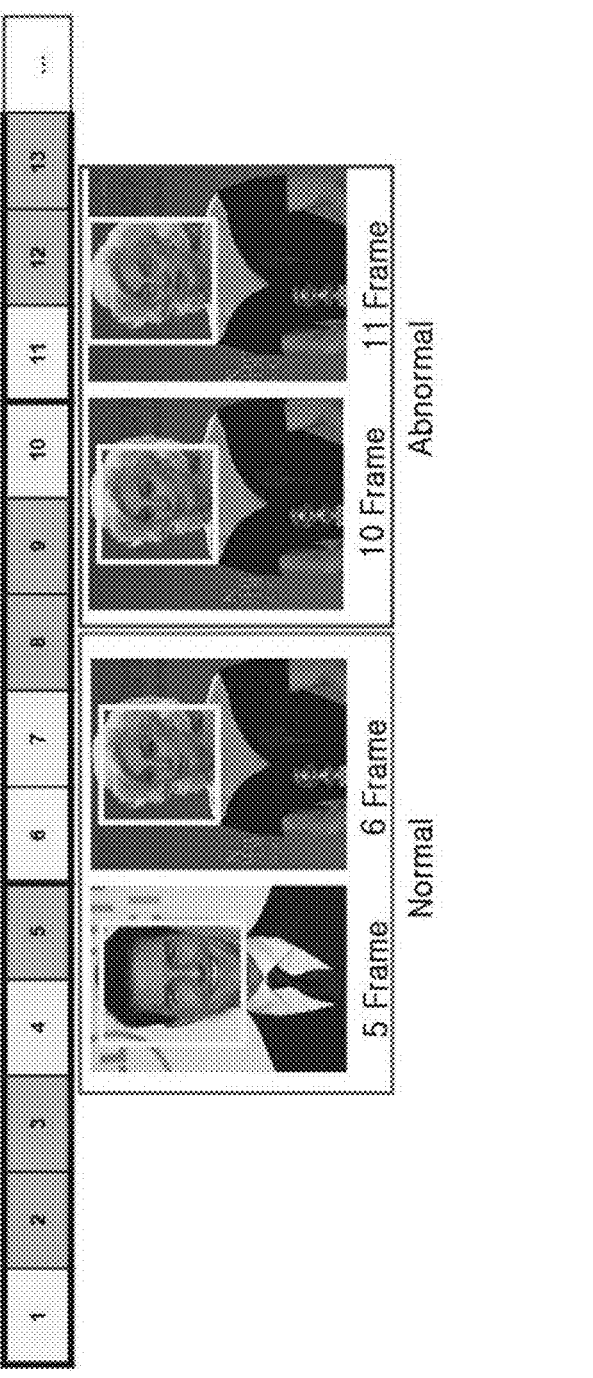
FIG. 8 is a view illustrating an embodiment of a faked frame according to similarity measurement to an MCU according to an embodiment.

FIG. 8 is a view illustrating an embodiment of a faked frame according to similarity measurement to an MCU according to an embodiment. In the fifth and sixth frames, since the background regions are different, a scene change may have occurred. Therefore, fake detection for ROI regions (e.g., face regions) is not performed. In the tenth and eleventh frames, the background regions are identical, but faces of the ROI regions are different. Therefore, fake detection for ROI regions (e.g., face regions) is performed, and the similarity measurement will predict that the data has been altered (a fake has occurred).

Figure 9:
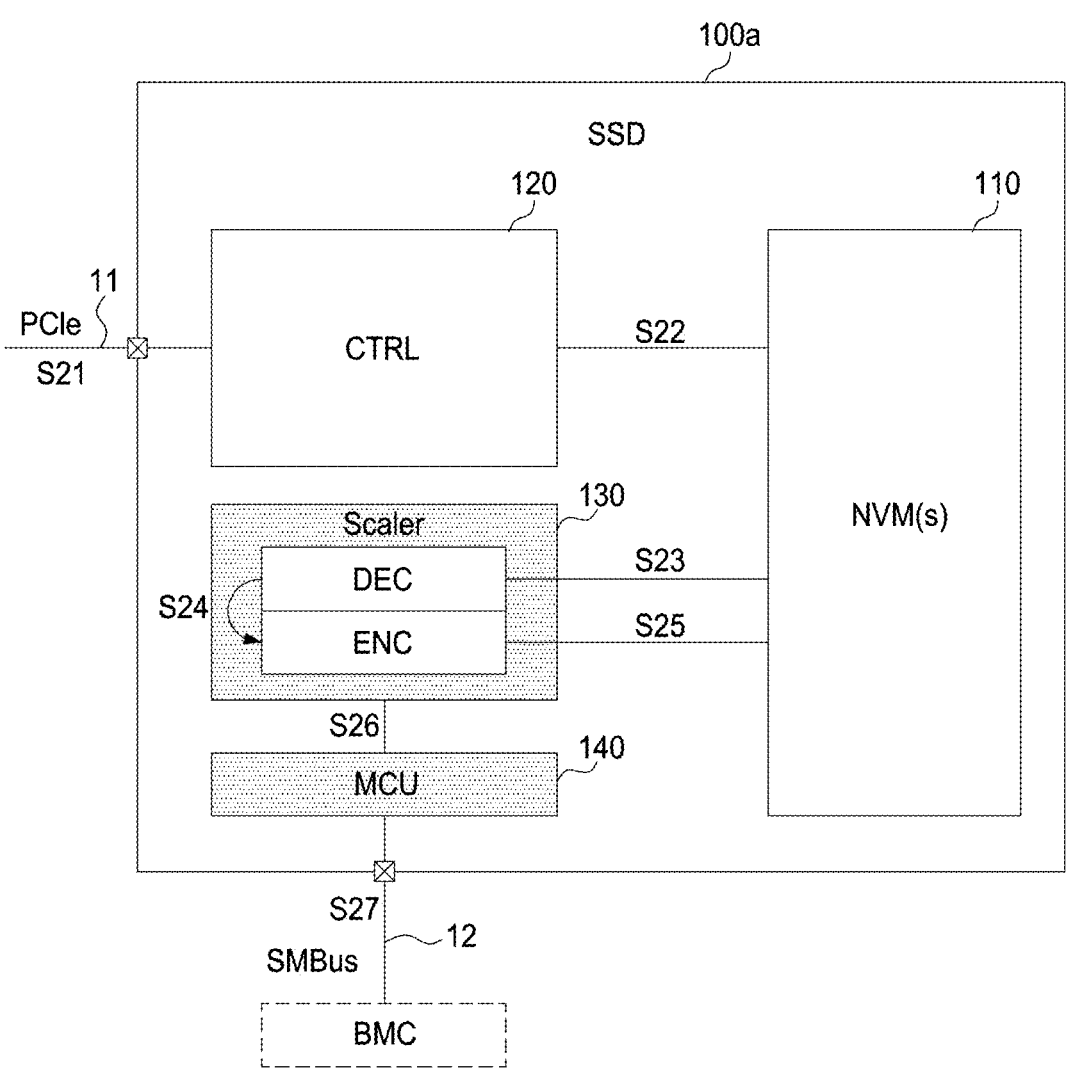
FIG. 9 is a view illustrating a fake checking process for a frame of a storage device 100 according to an embodiment.

FIG. 9 is a view illustrating a fake checking process for a frame of a storage device 100 according to an embodiment. As illustrated in FIG. 9, a storage device SSD 100 may encode/decode video data using a dedicated codec (a scaler 130). An MCU 140 may check for alteration of the video data through comparison of adjacent frames based on an intra-frame in series.

A host device 200 (see FIG. 1) may transmit the video data to the storage device 100 through a first channel 11 (e.g., a PCIe) (S21). In this case, the video data may be 4K byte video data. However, a size of the video data is not limited thereto. A controller CTRL 120 of the storage device 100 may store the transmitted video data in a non-volatile memory device NVM 110 (S22).

Thereafter, the scaler 130 of the storage device 100 may read the video data from the non-volatile memory device 110 to perform re-encoding in resolutions of ultra-high definition (UHD), quad high definition (QHD), full high definition (FHD), high definition (HD), and standard definition (SD) (S23), and the read data may be decoded using a codec (e.g., a decoder DEC 131) (S24). Thereafter, the scaler 130 may encode the decoded data to a desired resolution using an encoder ENC 132. The scaler 130 may store the encoded data in the non-volatile memory device 110 by the controller 120 (S25).

The MCU 140 may check the video data output after being decoded by the scaler 130 (S26). The MCU 140 may update processing logic and algorithms. The MCU 140 may compare the decoded video data with a previous frame in an ROI region and a general region, to measure similarity. If the background regions are different, it may be determined as a scene change, and a test for altered data (test for a fake) may not be performed. If the background regions are identical and ROI regions (e.g., face regions) are different, a fake of the video data is predicted. The MCU 140 may determine that the video data is faked when the similarity is less than a certain threshold value. The MCU 140 may add a fake suspicion flag to meta of a frame determined to be fake. The MCU 140 may inform a BMC or an external device of fake detection information through a second channel 12 (e.g., an SMBus) (S27).

Figure 10:
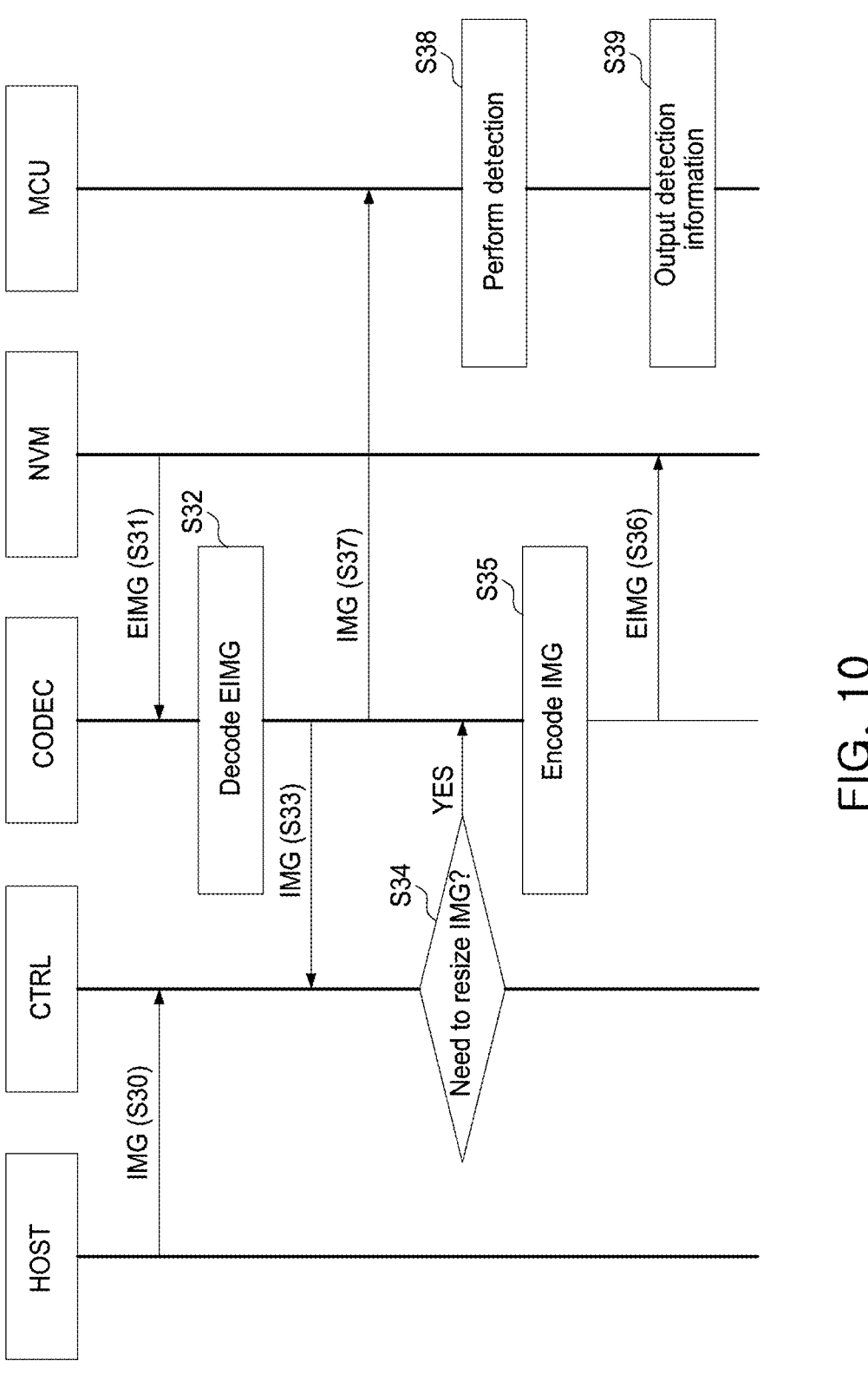
FIG. 10 is a ladder diagram illustrating a process of processing video data in a host system according to an embodiment.

FIG. 10 is a ladder diagram illustrating a process of processing video data in a host system according to an embodiment. Referring to FIG. 10, video data processing may proceed as follows.

A HOST may transmit video data IMG to a controller CTRL (S30). In this case, the video data IMG may be video data having a plurality of contiguous frames. An NVM may output encoded video data EIMG (S31). The encoded video data EIMG of the NVM may be output to a CODEC via the controller CTRL, or may be output to the CODEC directly from the NVM. The CODEC may decode the encoded video data EIMG (S32). The decoded video data IMG may be output to the controller CTRL (S33). Thereafter, the controller CTRL may determine whether resizing of the video data IMG is necessary (S34). For example, the controller CTRL may determine whether or not resolution of the video data IMG needs to be changed. If resizing of the video data IMG is required, the controller CTRL may transmit the video data IMG to the CODEC. The CODEC may perform encoding on the video data IMG (S35). The CODEC may output encoded video data EIMG to the NVM (S36). This encoded video data EIMG may be stored in the NVM via the controller CTRL or directly stored in the NVM.

During this encoding operation, the MCU may perform a detection operation of the video data to detect altered video data (detect a fake). The MCU may receive the video data IMG decoded in real time from the CODEC (S37). The MCU may compare adjacent frames of an intra-frame, in series, with respect to the received video data IMG, to perform the detection (S38). When an alteration (a fake) of the video data IMG is detected, the MCU may output detection information to an external device (S39).

A storage device according to an embodiment may include a buffer memory between a scaler and a non-volatile memory device.

Figure 11:
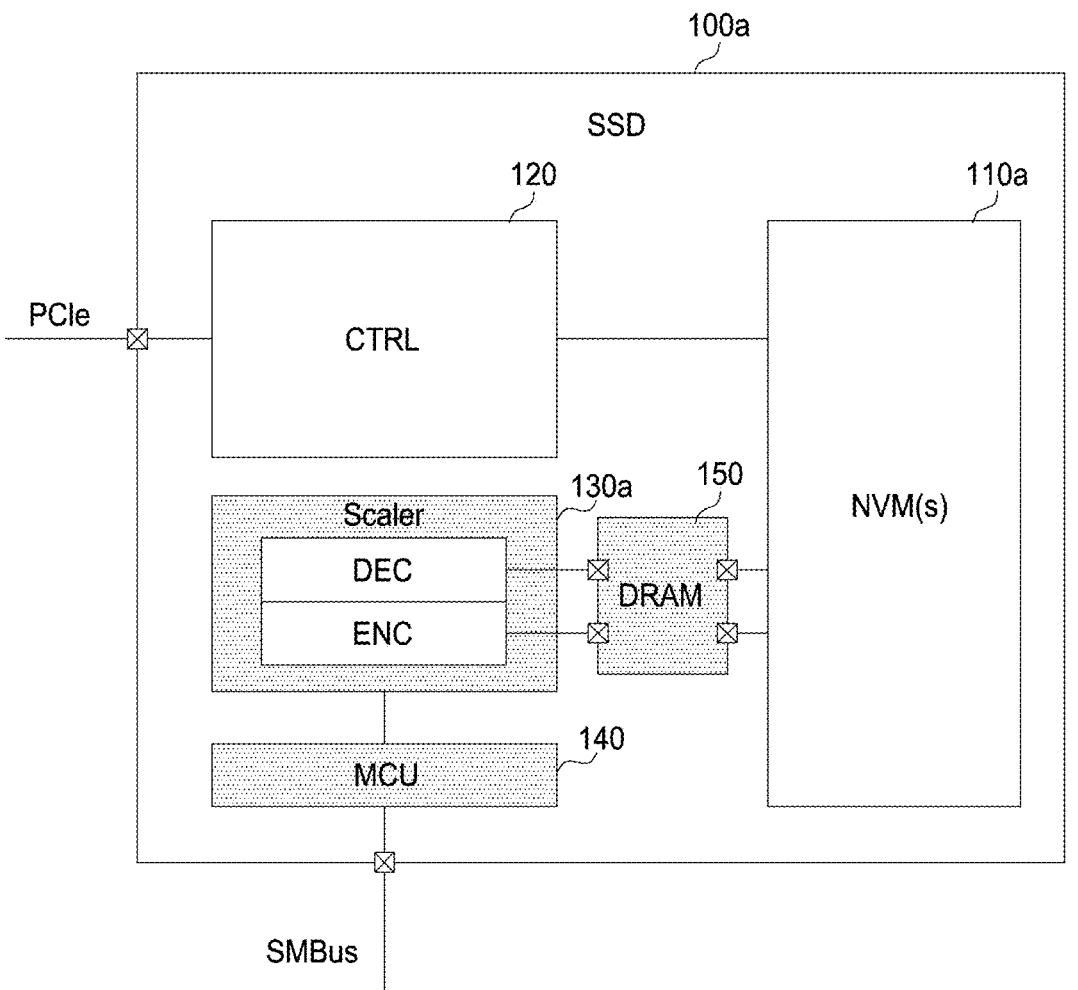
FIG. 11 is a view illustrating a storage device 100a according to another embodiment.

FIG. 11 is a view illustrating a storage device 100a according to another embodiment. Referring to FIG. 11, a storage device 100a may further include a buffer memory DRAM 150 added between a scaler 130a and a non-volatile memory device 110a, as compared to the storage device 100 of FIG. 2. The buffer memory DRAM 150 may be implemented as a volatile memory device.

The buffer memory DRAM 150 may be implemented as a dual port. In an embodiment, the buffer memory DRAM 150 may receive encoded video data from the scaler 130a through at least one first port, and may output the encoded video data to the non-volatile memory device 110a through at least one second port. In another embodiment, the buffer memory DRAM 150 may receive encoded video data stored in the non-volatile memory device 110a through the at least one second port, and may output the encoded video data to the scaler 130a through the at least one first port.

A storage device according to an embodiment may be implemented as an MCU that performs a codec function and a detection function.

Figure 12:
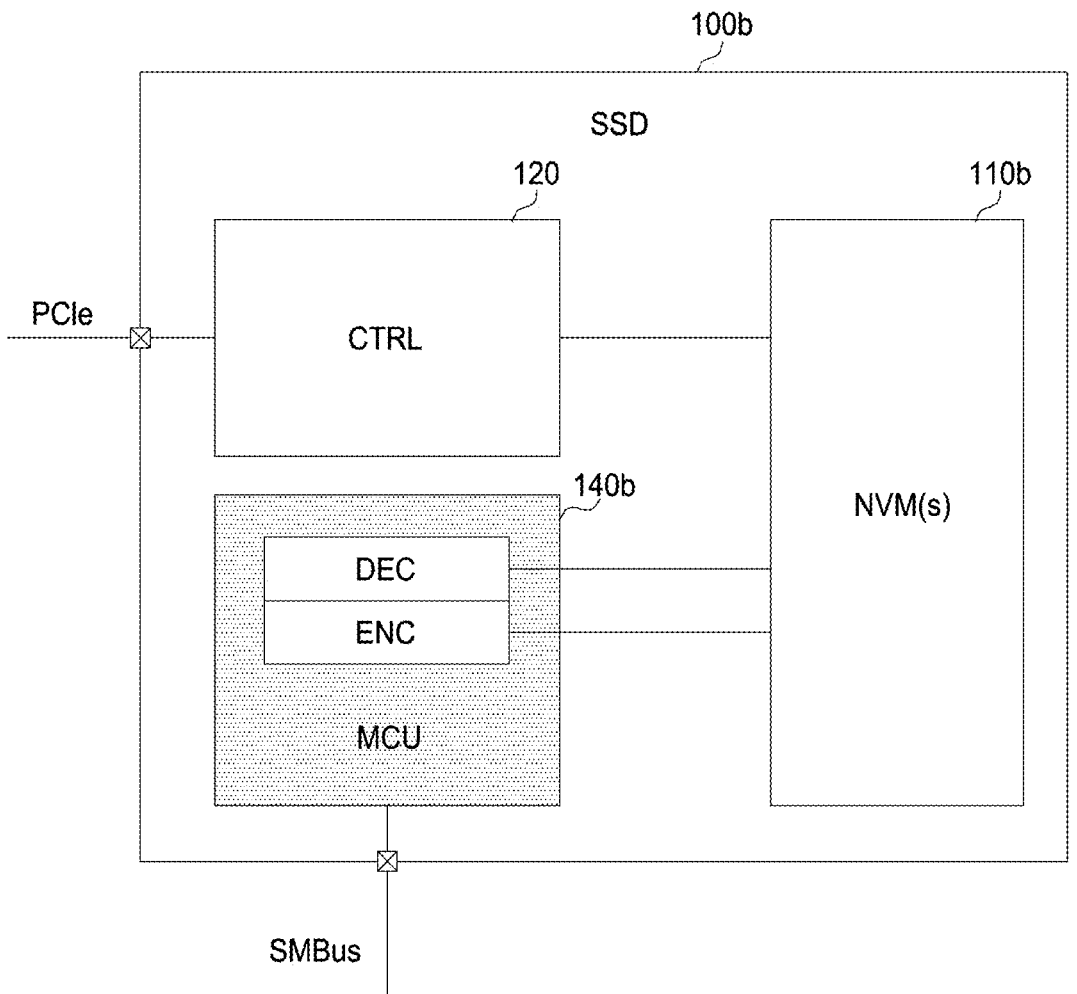
FIG. 12 is a view illustrating a storage device 100b according to another embodiment.

FIG. 12 is a view illustrating a storage device 100b according to another embodiment. Referring to FIG. 12, a storage device 100b may include an MCU 140b that performs both a scaler (codec) function and a detection function, as compared to the storage device 100 of FIG. 2.

Figure 13:
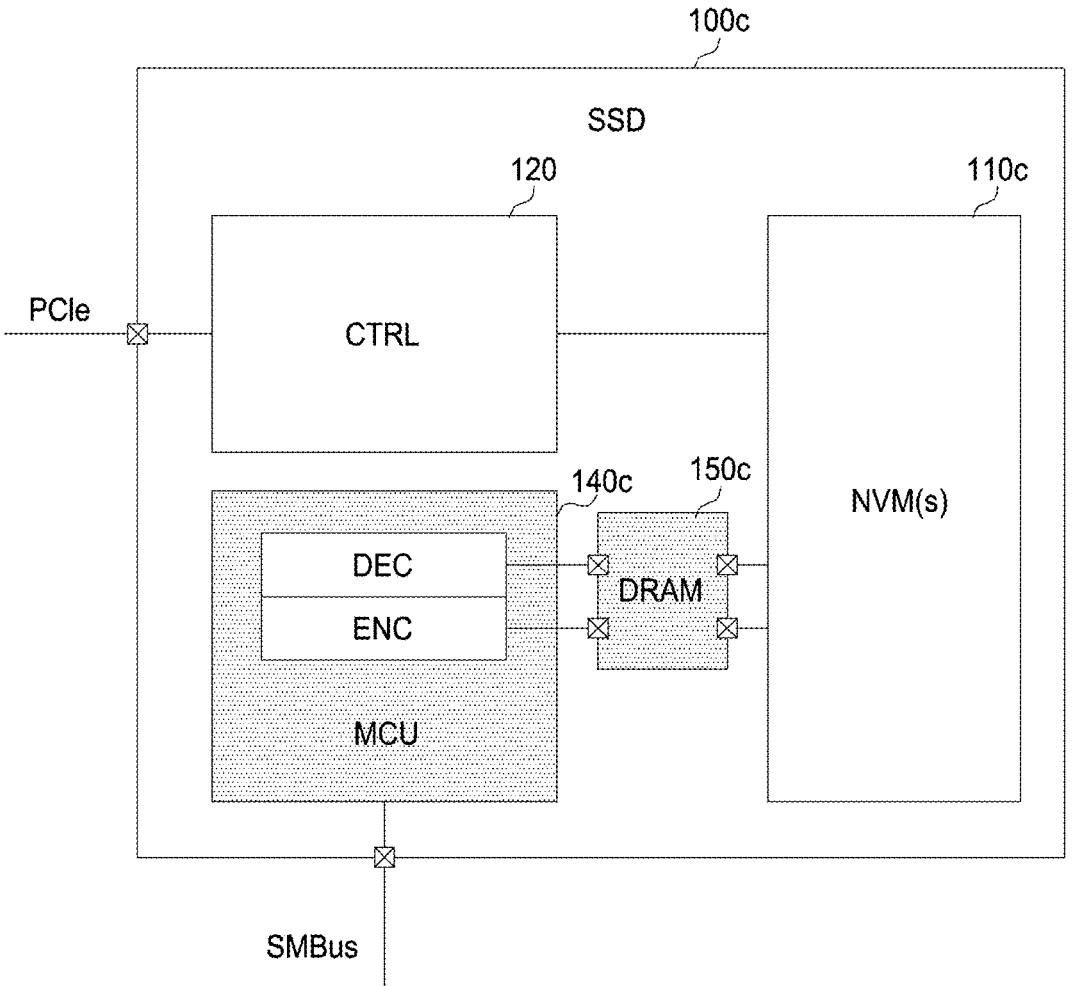
FIG. 13 is a view illustrating a storage device 100c according to another embodiment.

FIG. 13 is a view illustrating a storage device 100c according to another embodiment. Referring to FIG. 13, a storage device 100c may include an MCU 140c that performs both a scaler (codec) function and a fake detection function, as compared to that of the storage device 100b of FIG. 12.

A user device according to an embodiment may be a smart storage device.

Figure 14:
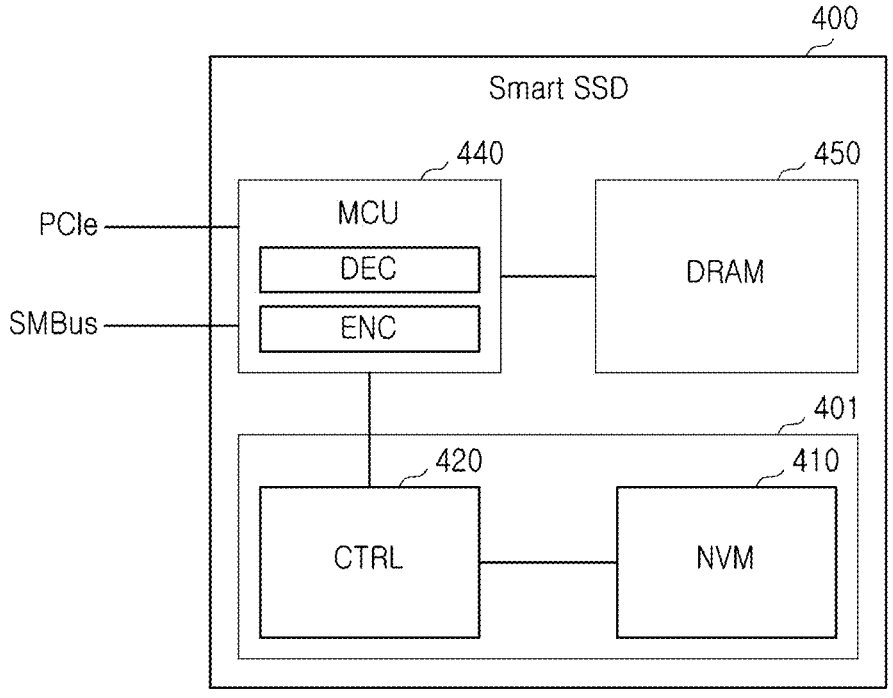
FIG. 14 is a view illustrating a smart storage device 400 according to an embodiment.

FIG. 14 is a view illustrating a smart storage device 400 according to an embodiment. Referring to FIG. 14, a smart storage device 400 may include a storage device 401, an MCU 440, and a DRAM 450.

The storage device 401 may include a non-volatile memory device 410 and a controller CTRL 420 for controlling the same.

The MCU 440 may be implemented to exclusively process video data. The MCU 440 may receive the video data from an external device through a first communication channel. In an embodiment, a first communication channel may transmit data according to a PCIe method. In addition, the MCU 440 may transmit state information of the smart storage device 400 to an external device through a second communication channel. In an embodiment, a second communication channel may transmit data according to a CMBus method.

The MCU 440 may include an encoder ENC encoding video data, and a decoder DEC decoding the encoded video data. In particular, as described with reference to FIGS. 1 to 13, the MCU 440 may compare adjacent frames of an intra-frame, in series, to detect fake of the video data.

The DRAM 450 may be implemented to store temporary data in processing operations of the MCU 440.

Figure 15:
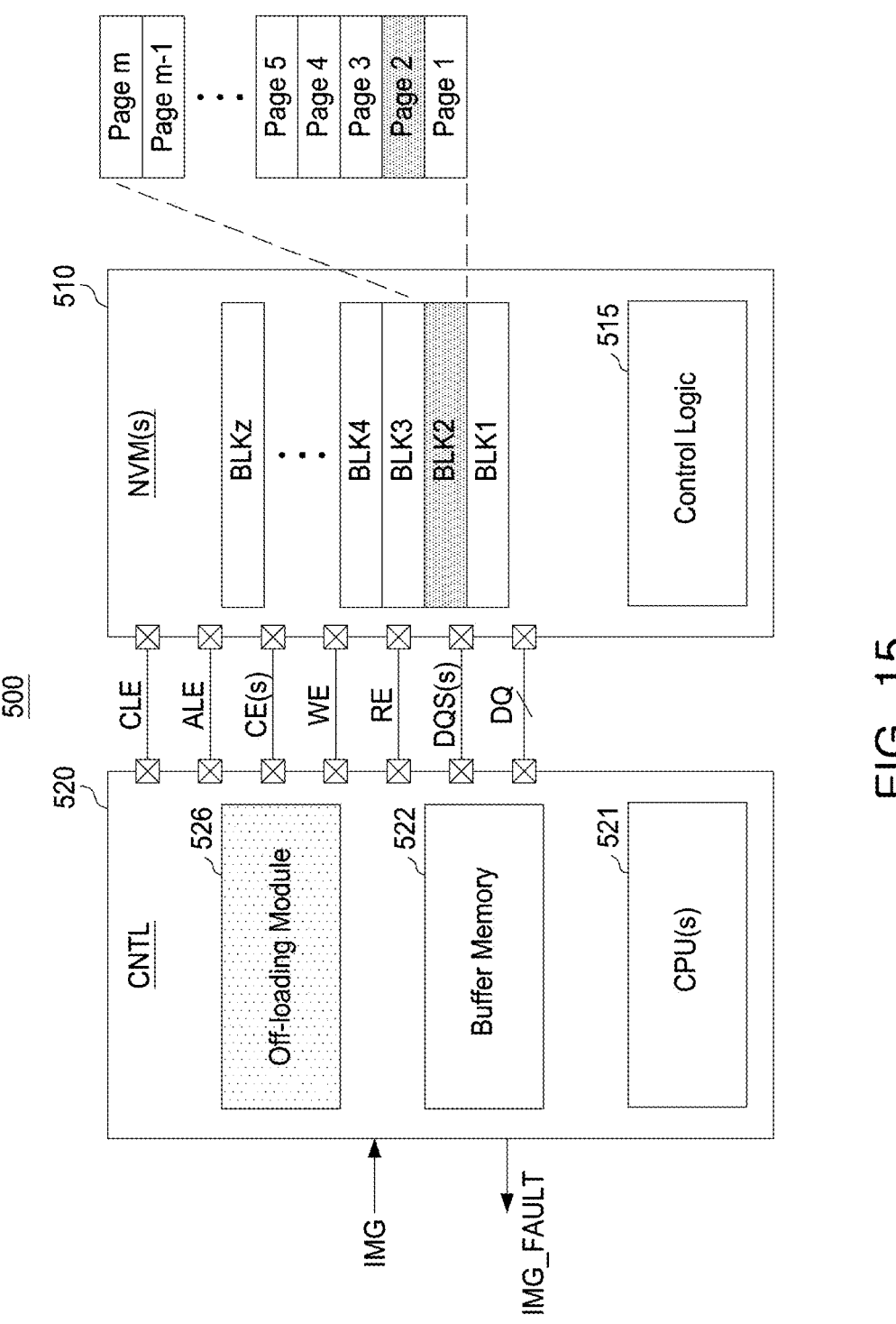
FIG. 15 is a view illustrating a storage device 500 according to an embodiment.

FIG. 15 is a view illustrating a storage device 500 according to an embodiment. Referring to FIG. 15, a storage device 500 may include at least one non-volatile memory device NVM(s) 510 and a controller CNTL 520.

The at least one non-volatile memory device 510 may be implemented to store data. Also, the non-volatile memory device 510 may be implemented to include a plurality of memory blocks BLK1 to BLKz (z is an integer equal to or greater than 2) and a control logic 515. Each of the plurality of memory blocks BLK1 to BLKz may include a plurality of pages Page 1 to Page m (m is an integer equal to or greater than 2). Each of the plurality of pages Page 1 to Page m may include a plurality of memory cells. Each of the plurality of memory cells may store at least one bit. The control logic 515 may receive a command and an address from the controller 520 (CNTL), and may perform an operation (a program operation, a read operation, erase operation, or the like,) corresponding to the received command on memory cells corresponding to the address.

The controller 520 (CNTL) may be connected to the at least one non-volatile memory device 510 through a plurality of control pins for transmitting control signals (e.g., CLE, ALE, CE(s), WE, RE, or the like). Also, the controller 520 may be implemented to control the non-volatile memory device 510 using control signals (CLE, ALE, CE(s), WE, RE, or the like). For example, the non-volatile memory device 510 may latch a command or an address on an edge of a write enable (WE)/read enable (RE) signal according to a command latch enable (CLE) signal and an address latch enable (ALE) signal, such that program operation/read operation/erase operation may be performed. For example, during a read operation, a chip enable signal CE may be activated, CLE may be activated during a command transmission period, ALE may be activated during an address transmission period, and RE may be toggled during a period in which data is transmitted through a data signal line DQ. A data strobe signal DQS may be toggled with a frequency corresponding to a data input/output speed. Read data may be transmitted in sequence in synchronization with the data strobe signal DQS.

Also, the controller 520 may include at least one processor 521 (central processing units (CPUs), a buffer memory 522, and an offloading module 526.

The processor 521 may be implemented to control overall operation of the storage device 500. The buffer memory 522 may be implemented as a volatile memory (e.g., a static random access memory (SRAM), a dynamic RAM (DRAM), a synchronous RAM (SDRAM), or the like), or a non-volatile memory (a flash memory, a phase-change RAM (PRAM), a magneto-resistive RAM (MRAM), a resistive RAM (ReRAM), a ferroelectric RAM (FRAM), or the like).

The offloading module 526 may be implemented to perform a security function of the storage device 500 or an image processing function of the storage device 500. For example, the offloading module 526 may perform a self-encryption disk (SED) function or a trusted computing group (TCG) security function. The SED function may store encrypted data in the non-volatile memory device 510 using an encryption algorithm or may decrypt data encrypted from the non-volatile memory device 510. The encryption/decryption operation may be performed using an internally generated encryption key. In an example embodiment, the encryption algorithm may be an advanced encryption standard (AES) encryption algorithm. The encryption algorithm is not limited thereto. The TCG security function may provide a mechanism enabling access control to user data on the storage device 500. For example, the TCG security function may perform an authentication procedure between an external device and the storage device 500. In an example embodiment, the SED function or the TCG security function may be optionally selected.

Additionally, the offloading module 526 may be implemented to perform a homomorphic cryptographic operation. For example, the offloading module 526 may generate a ciphertext (EDATA) based on a leveled homomorphic encryption algorithm. The offloading module 526 may receive the operation result received from the host device, and may decrypt the result based on the leveled homomorphic encryption algorithm.

Also, the offloading module 526 may perform video data processing operations as described with reference to FIGS. 1 to 14. In this case, the image processing operation may include an encoding/decoding operation for video data and a fake detection operation.

Embodiments are, for example, applicable to an electronic device having a storage device.

Figure 16:
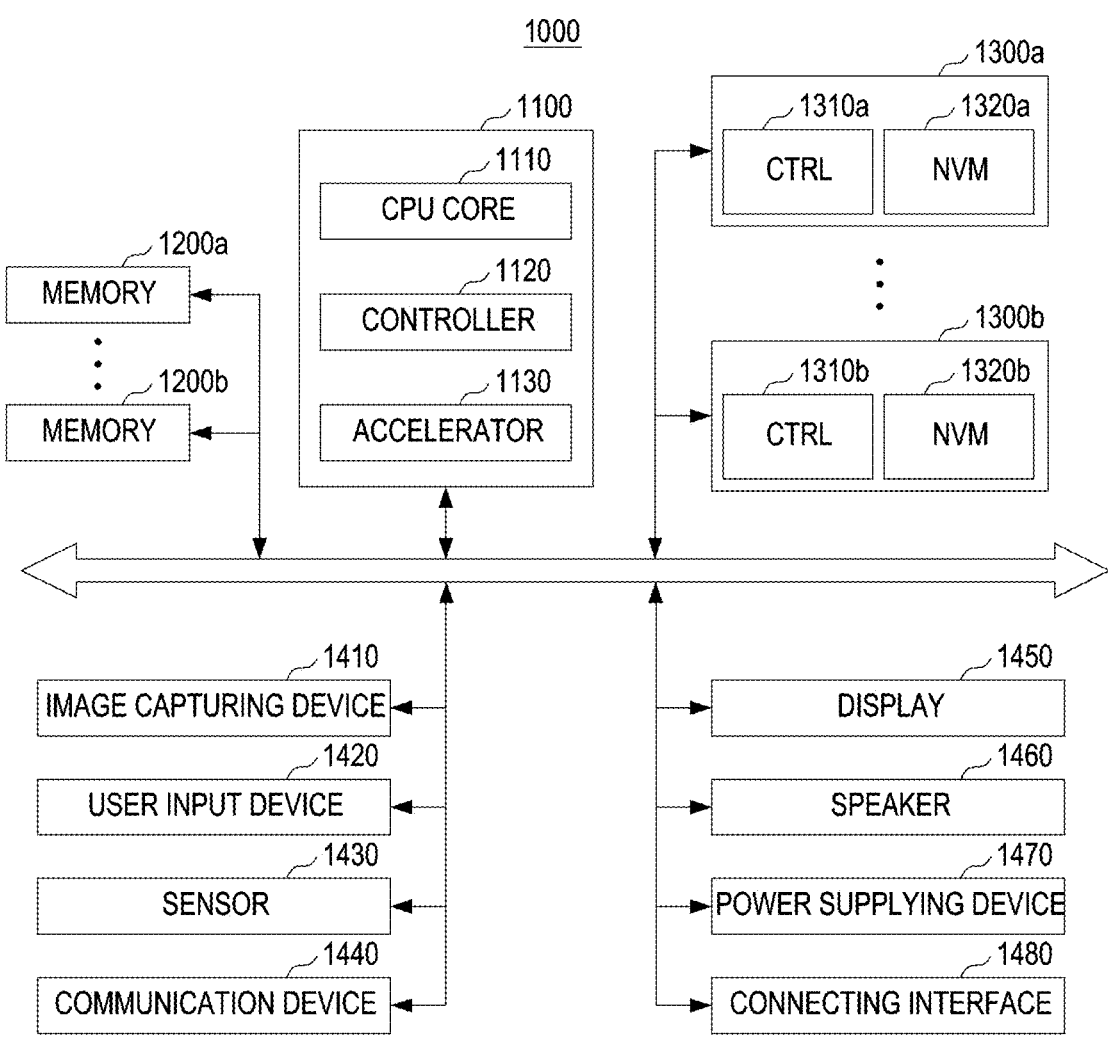
FIG. 16 is a view illustrating an electronic device 1000 to which a storage device according to an embodiment is applied.

FIG. 16 is a view illustrating an electronic device 1000 to which a storage device according to an embodiment is applied. An electronic device 1000 illustrated in FIG. 15 may be implemented as a mobile system such as a mobile phone, a smart phone, a tablet personal computer (PC), a wearable device, a health care device, or an Internet of Things (IoT) device. However, the electronic device 1000 in FIG. 13 is not necessarily limited to a mobile system, and may be implemented as a personal computer, a laptop computer, a server, a media player, or an automotive device such as a navigation device.

Referring to FIG. 16, the electronic device 1000 may include a main processor 1100, memories 1200a and 1200b, storage devices 1300a and 1300b, an image capturing device 1410, a user input device 1420, a sensor 1430, a communication device 1440, a display 1450, a speaker. 1460, a power supplying device 1470, and a connecting interface 1480.

The main processor 1100 may control overall operation of the electronic device 1000, more specifically, operations of other components included in the electronic device 1000. The main processor 1100 may be implemented as a general processor, a dedicated processor, or an application processor.

The main processor 1100 may include one or more CPU cores 1110. Also, the main processor 1100 may further include a controller 1120 for controlling the memories 1200a and 1200b or the storage devices 1300a and 1300b. In an example embodiment, the main processor 1100 may further include an accelerator 1130 which may be a dedicated circuit for high-speed data operation such as artificial intelligence (AI) data operation or the like. The accelerator 1130 may include a graphics processing unit (GPU), a neural processing unit (NPU), or a data processing unit (DPU). The accelerator 1130 may be implemented as a chip physically independent from the other components of the main processor 1100.

The memories 1200a and 1200b may be used as main memory devices of the electronic device 1000. The memories 1200a and 1200b may include volatile memories such as SRAM or DRAM, or may include non-volatile memories such as a flash memory, PRAM or RRAM. The memories 1200a and 1200b may be implemented in the same package as the main processor 1100.

The storage devices 1300a and 1300b may be implemented as non-volatile storage devices storing data regardless of whether power is supplied or not. The storage devices 1300a and 1300b may have a relatively large storage capacity as compared to that of the memories 1200a and 1200b. The storage devices 1300a and 1300b may include memory controllers 1310a and 1310b and non-volatile memory (NVM) 1320a and 1320b for storing data under control of the memory controllers 1310a and 1310b. The non-volatile memories 1320a and 1320b may include a flash memory having a two-dimensional (2D) structure or a three-dimensional (3D) vertical NAND (V-NAND) structure, or may include other types of non-volatile memory such as PRAM or RRAM. Also, the storage devices 1300a and 1300b may be implemented to perform encryption/decryption operations using a homomorphic encryption algorithm. Also, the storage devices 1300a and 1300b may be implemented to perform a fake detection operation on video data as described with reference to FIGS. 1 to 14, and to output fake detection information according to a detection result.

The storage devices 1300a and 1300b may be included in the electronic device 1000 in a state of being physically separated from the main processor 1100. Also, the storage devices 1300a and 1300b may be implemented in the same package as the main processor 1100. Also, the storage devices 1300a and 1300b may have the same shape as a solid state device (SSD) or a memory card, such that the storage devices may be detachable from the other components of the electronic device 1000 through an interface such as the connecting interface 1480. The storage devices 1300a and 1300b may be applied with standard protocols such as universal flash storage (UFS), embedded multi-media card (eMMC), or non-volatile memory express (NVMe), but an example embodiment thereof is not limited thereto.

The image capturing device 1410 may obtain a still image or a video. The image capturing device 1410 may be implemented as a camera, a camcorder, a webcam, or the like. The user input device 1420 may receive various types of data input from a user of the electronic device 1000, and may be implemented as a touch pad, a keypad, a keyboard, a mouse, a microphone, or the like. The sensor 1430 may detect various types of physical quantities which may be obtained from an external entity of the electronic device 1000, and may convert the sensed physical quantities into electrical signals. The sensor 1430 may be implemented as a temperature sensor, a pressure sensor, an illuminance sensor, a position sensor, an acceleration sensor, a biosensor, a gyroscopic sensor, or the like. The communication device 1440 may transmit wired/wireless signals and transmit and receive wired/wireless signals to and from external devices of the electronic device 1000 according to various communication protocols. The communication device 1440 may include an antenna, a transceiver, a modem (MODEM), or the like. The display 1450 and the speaker 1460 may function as output devices configured to output visual information and auditory information to the user of the electronic device 1000. The power supply device 1470 may appropriately convert power supplied from a battery embedded in the electronic device 1000 or an external power source, and may supply power to each component of the electronic device 1000.

The connecting interface 1480 may provide connection between the electronic device 1000 and an external device connected to the electronic device 1000 to exchange data with the external device. The connecting interface 1480 may be implemented by various interface methods such as advanced technology attachment (ATA), serial ATA (SATA), external SATA(e-SATA), small computer small interface (SCSI), serial attached SCSI (SAS), peripheral component interconnection (PCI), PCI express (PCIe), NVMe, IEEE 1394, universal serial bus (USB), secure digital (SD) card, multi-media card (MMC), eMMC, UFS, embedded universal flash storage (eUFS), compact flash (CF) card interface, or the like.

A general SSD may not detect faked data when it creates images of various sizes for each resolution by itself. In an SSD of an example embodiment, an SSD having a dedicated codec may compare adjacent frames of an Iframe, in series, to check data fake by an MCU. The MCU may compare the data with a previous frame in an ROI region and a general region, to measure similarity. It may be checked through decoding in an idle time of SSD codec/MCU. If the similarity exceeds a certain threshold, it may be determined that the data is faked. A fake suspicion flag may be added to an image meta. Fake detection information may be notified to a BMC or an external source through a 2nd channel.

In the above-described embodiments, components according to embodiments may be referred to using blocks. The blocks may be implemented as various hardware devices such as an integrated circuit (IC), an application specific IC (ASIC), a field programmable gate array (FPGA), a complex programmable logic device (CPLD), a firmware running on hardware devices, software such as applications, or a combination of a hardware device and software. In addition, the blocks may include circuits composed of semiconductor elements in an IC or circuits registered as intellectual property (IP).

According to an embodiment, a storage device, a host system having the same, and a method of operating the same may compare adjacent frames of an intra-frame, in series, during an operation of a codec, to detect altered (faked) video data and output detected information indicating the video data has been altered (faked).

While example embodiments have been illustrated and described above, it will be apparent to those skilled in the art that modifications and variations could be made without departing from the scope of the present disclosure as defined by the appended claims.

What is claimed is:

1. An operating method of a storage device, the operating method comprising:
 receiving decoded data from a codec;
 determining whether the decoded data includes a region of interest (ROI), wherein the ROI comprises a facial region;
 based on determining the ROI is included in the decoded data, determining whether the decoded data includes a first background region, other than the ROI, identical to a second background region of an adjacent frame;
 based on determining the first background region is identical to the second background region, determining a similarity for the ROI between the decoded data and the adjacent frame using locality sensitive hashing (LSH);
 determining whether the similarity is lower than a reference value; and
 based on determining the similarity is lower than the reference value, generating detection information indicating that the decoded data is faked.

2. The operating method of claim 1, wherein the decoded data comprises an intra-frame.

3. The operating method of claim 2, wherein the adjacent frame comprises a previous frame or a subsequent frame of the intra-frame.

4. The operating method of claim 1, wherein the adjacent frame is a predicted frame or a bidirectional predicted frame.

5. The operating method of claim 1, further comprising:
 reading encoded video data from a non-volatile memory device; and
 decoding the encoded video data in the codec.

6. The operating method of claim 1, further comprising adding a flag corresponding to fake detection into metadata corresponding to the decoded data when the decoded data is faked.

7. The operating method of claim 1, further comprising:
    outputting the detection information to a baseband management controller or an external device through a sideband channel.

8. The operating method of claim 1, wherein, based on the ROI being not included in the decoded data, the first background region and the second background region not being identical in the decoded data, or the similarity not being lower than the reference value, a detection operation for a subsequent frame is performed.

9. A storage device comprising:
    at least one non-volatile memory device;
    a controller connected to a first channel and configured to control the at least one non-volatile memory device;
    a scaler configured to encode video data using a codec or to decode encoded video data using the codec; and
    a microcontroller unit (MCU) configured to:
        perform a detection operation for detecting images which have been altered of the decoded video data from the scaler, wherein the detection operation compares an intra-frame with an adjacent frame, wherein the detection operation compares a region of interest (ROI) in the intra-frame with the ROI in the adjacent frame, wherein the ROI comprises a facial region,
        generate detection information according to the detection operation, and
        output the detection information to an external device through a second channel,
    wherein based on the ROI not being included in the intra-frame, a first background region and a second background region not being identical, respectively in the intra-frame and the adjacent frame, or a similarity not being lower than a reference value, the detection operation for a subsequent frame is performed, and the similarity is determined using locality sensitive hashing (LSH).

10. The storage device of claim 9, wherein the scaler comprises:
    a media map table configured to map a logical address to the encoded video data stored in the at least one non-volatile memory device;
    a decoder configured to:
    receive the encoded video data from the at least one non-volatile memory device using the media map table, decode the encoded video data using the codec; and
    at least one encoder configured to encode the decoded video data using the codec.

11. The storage device of claim 9, wherein the MCU is further configured to receive the decoded video data,
    wherein the decoded video data comprises the intra-frame, and
    wherein the MCU is further configured to compare a previous frame or the subsequent frame of the intra-frame to perform the detection operation.

12. The storage device of claim 9, wherein the MCU is further configured to:
    generate the detection information according to a result of the detection operation.

13. The storage device of claim 9, wherein the first channel is configured to transmit first data according to a PCIe interface method, and
    wherein the second channel is configured to transmit second data according to an SMBus interface method.

14. A host system comprising:
    a storage device configured to perform a detection operation with respect to video data, wherein the detection operation compares an intra-frame with an adjacent frame, wherein the detection operation compares a region of interest (ROI) in the intra-frame with the ROI in the adjacent frame, wherein the ROI comprises a facial region; and
    a host device configured to:
    transmit the video data to the storage device through a first channel, and
    receive detection information of the video data from the storage device through a second channel,
    wherein the video data includes a plurality of contiguous frames,
    wherein the plurality of contiguous frames include the intra-frame, and a predicted frame or a bidirectional predicted frame,
    wherein the detection operation compares the intra-frame and the predicted frame or compares the intra-frame and the bidirectional predicted frame, and
    wherein based on the ROI not being included in the intra-frame, a first background region and a second background region not being identical, respectively in the intra-frame and the adjacent frame, or a similarity not being lower than a reference value, the detection operation for a subsequent frame is performed, and the similarity is determined using locality sensitive hashing (LSH).

15. The host system of claim 14, wherein the storage device comprises:
    at least one non-volatile memory device; and
    a controller connected to the first channel and configured to control the at least one non-volatile memory device.

16. The host system of claim 14, wherein the storage device further comprises a microcontroller unit (MCU) comprising:
    an encoder configured to:
        receive the video data through the first channel, and
        encode the video data using a codec; and
        a decoder configured to decode encoded video data using the codec, and
    wherein the MCU is configured to:
        perform the detection operation for detecting altered images of the decoded video data,
        generate the detection information according to the detection operation, and
        output the detection information to an external device through the second channel.

17. The host system of claim 16, wherein the storage device further comprises a buffer memory storing encoded video data output from the MCU.

18. The host system of claim 16, wherein the storage device further comprises a buffer memory configured to:
    receive encoded video data from the MCU through a first port, and
    output the encodedvideo data to the at least one non-volatile memory device through a second port.

\* \* \* \* \*